(12) United States Patent
Sugaya

(10) Patent No.: US 9,712,653 B2
(45) Date of Patent: Jul. 18, 2017

(54) DATA TRANSMISSION DEVICE, DATA TRANSMISSION METHOD AND PROGRAM FOR DATA TRANSMISSION DEVICE

(71) Applicant: OPTiM Corporation, Saga (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 14/938,925

(22) Filed: Nov. 12, 2015

(65) Prior Publication Data

US 2016/0337499 A1 Nov. 17, 2016

(30) Foreign Application Priority Data

May 12, 2015 (JP) .................. 2015-097624

(51) Int. Cl.
- *H04B 1/38* (2015.01)
- *H04M 1/2745* (2006.01)
- *H04M 1/725* (2006.01)
- *H04W 8/00* (2009.01)
- *H04M 1/00* (2006.01)

(52) U.S. Cl.
CPC ..... *H04M 1/27455* (2013.01); *H04M 1/7253* (2013.01); *H04W 8/00* (2013.01)

(58) Field of Classification Search
CPC ... G06F 21/35; G06F 3/04817; H04B 5/0031; H04M 2250/04; H04N 21/43637; H04N 1/00411; H04N 1/00472; H04N 2201/0096

USPC .......................................... 455/566
See application file for complete search history.

(56) References Cited

U.S. PATENT DOCUMENTS

| | | | | |
|---|---|---|---|---|
| 2004/0109019 | A1* | 6/2004 | Miyamoto | G06F 21/606 715/741 |
| 2008/0201446 | A1* | 8/2008 | Svendsen | G06F 21/10 709/218 |
| 2014/0087654 | A1* | 3/2014 | Kiveisha | H04B 5/0031 455/41.1 |
| 2014/0184821 | A1* | 7/2014 | Taneichi | H04N 21/2743 348/207.1 |
| 2014/0211035 | A1* | 7/2014 | Hong | H04N 5/23229 348/222.1 |
| 2017/0076144 | A1* | 3/2017 | Iwasaki | G06K 9/00288 |

FOREIGN PATENT DOCUMENTS

JP 2013-205945 10/2013

* cited by examiner

*Primary Examiner* — Timothy Pham
(74) *Attorney, Agent, or Firm* — Lex IP Meister, PLLC.

(57) ABSTRACT

The present invention is to provide a data transmission device to enable a sender to easily transmit predefined data to a proper user and a proper terminal even if the receiver owns two or more user IDs and terminals. The data transmission device 100 is provided with a user icon output module 133 outputting a user icon associated with a user ID to display in a sender's terminal, and a data transmission module 136 transmitting predefined data associated with the user icon specified by a sender to a terminal corresponding to the user ID associated with the specified user icon.

7 Claims, 5 Drawing Sheets

Steve　　　　　　　　Paul

Fig. 7

<Destination setting data table 1>

User ID: Steve

|  | ICON | ADDRESS | DEFAULT DESTINATION | NOTIFICATION DATA |
|---|---|---|---|---|
| Terminal A | Glasses | XX-XXXX |  |  |
| Terminal B | Watch | YY-YYYY | ○ |  |
| Terminal C | Smartphone | ZZ-ZZZZ |  | ○ |
| Terminal D | Shoes | AA-ZZZZ |  |  |

Fig. 8

<Destination setting data table 2>

User ID: Steve

|  | ICON | ADDRESS | SENTENCE DATA | IMAGE DATA | NOTIFICATION DATA |
|---|---|---|---|---|---|
| Terminal A | Glasses | XX-XXXX | ○ | ○ |  |
| Terminal B | Smartphone | YY-YYYY |  |  |  |
| Terminal C | Watch | ZZ-ZZZZ |  |  | ○ |
| Terminal D | Shoes | AA-ZZZZ |  |  |  |

DATA TRANSMISSION DEVICE, DATA TRANSMISSION METHOD AND PROGRAM FOR DATA TRANSMISSION DEVICE

CROSS REFERENCE TO RELATED APPLICATIONS

This application claims priority to Japanese Patent Application No. 2015-097624 filed on May 12, 2015, the entire contents of which are incorporated by reference herein.

TECHNICAL FIELD

The present invention relates to a data transmission device, a data transmission method and a program for data transmission device to transmit data to a terminal owned by a user such as wearable terminal.

BACKGROUND ART

Recently, the appearance of a wearable terminal in addition to a smart phone and a tablet terminal causes the number of terminals owned by a single user and the number of users owning a terminal to be increased. Therefore, it is preferable if the data is easily transmitted between these terminals.

For instance, Patent Document 1 discloses a data transmission operation device facilitating the data transmission of the device owned by a user by the touch operation. The disclosed device enables data transmission between the devices connected to a home network etc. to be done intuitively using a drag operation.

CITATION LIST

Patent Literature

Patent Document 1: JP 2013-205945 A

SUMMARY OF INVENTION

However, in Patent Document 1, not only a user to whom data is to be transmitted but also a device specified by the user cannot be specified. Recently, by the appearance of a wearable terminal in addition to a smart phone and a tablet terminal, number of users owning a terminal are increasing. Therefore, it is preferable to be able to easily specify a user to whom data is to be transmitted.

Moreover, number of the terminals owned by a single user is also increasing. So a sender should specify a terminal to which data is to be transmitted when transmitting data to a user. Therefore, it is preferable to enable a sender to easily specify a user and a terminal to which the data is to be transmitted so that the data will be properly transmitted.

In this context, the objective of the present invention is to provide a data transmission device, a data transmission method and a program for data transmission device to enable a sender to easily transmit predefined data to a proper user and a proper terminal even if the receiver owns two or more user IDs and terminals.

According to the first aspect of the present invention, a data transmission device includes:

a user icon output unit that outputs a user icon associated with a user ID to display in the sender's terminal; and a data transmission unit transmits predefined data associated with the user icon specified by a sender to a terminal corresponding to the user ID associated with the specified user icon.

According to the first aspect of the present invention, a data transmission device outputs a user icon associated with a user ID to display in the sender's terminal, and transmits predefined data associated with the user icon specified by the sender to the terminal corresponding to a user ID associated with the specified user icon.

The first aspect of the present invention is the category of a device, but the categories of a method and a program have the same functions and effects.

According to the second aspect of the present invention, the user terminal according to the first aspect of the present invention further includes:

a terminal data storage unit that associates and stores the terminal data and the terminal specific address of the terminal owned by a user with a user ID;

a terminal icon output unit that outputs a terminal icon specified by the stored terminal data to display the terminal icon in association with the user icon; and a data transmission unit transmits predefined data associated with the terminal icon specified by a sender to a terminal corresponding to the address associated with the specified terminal icon.

According to the second aspect of the present invention, the user terminal according to the first aspect of the present invention, associates and stores the terminal data and the terminal specific address of the terminal owned by a user with a user ID;

outputs a terminal icon specified by the stored terminal data to display the terminal icon in association with the user icon; and transmits predefined data associated with the terminal icon specified by a sender to a terminal corresponding to the address associated with the specified terminal icon.

According to the third aspect of the present invention, the user terminal according to the first aspect of the present invention further includes:

a receiving terminal setting receiver unit that receives and stores a setting of a receiver's user terminal to be used for receiving data from the data transmission device, wherein the data transmission unit transmits the predefined data to a previously stored receiver's user terminal.

According to the third aspect of the present invention, the user terminal according to the first aspect of the present invention receives and stores a setting of a receiver's user terminal to be used for receiving data from the data transmission device and the data transmission unit transmits the predefined data to a previously stored receiver's user terminal.

The present invention provides a data transmission device, a data transmission method and a program for data transmission device to enable a sender to easily transmit predefined data to a proper user and a proper terminal even if the receiver owns two or more user IDs and terminals.

BRIEF DESCRIPTION OF DRAWINGS

FIG. 7 shows a destination setting data table 1 stored in the sender's user terminal 50.

FIG. 8 shows a destination setting data table 2 stored in the sender's user terminal 50.

DESCRIPTION OF EMBODIMENTS

Embodiments of the present invention are described below with reference to the attached drawings. However, this is illustrative only, and the technological scope of the present invention is not limited thereto.

Configuration of Data Transmission System 1

Figure 1:
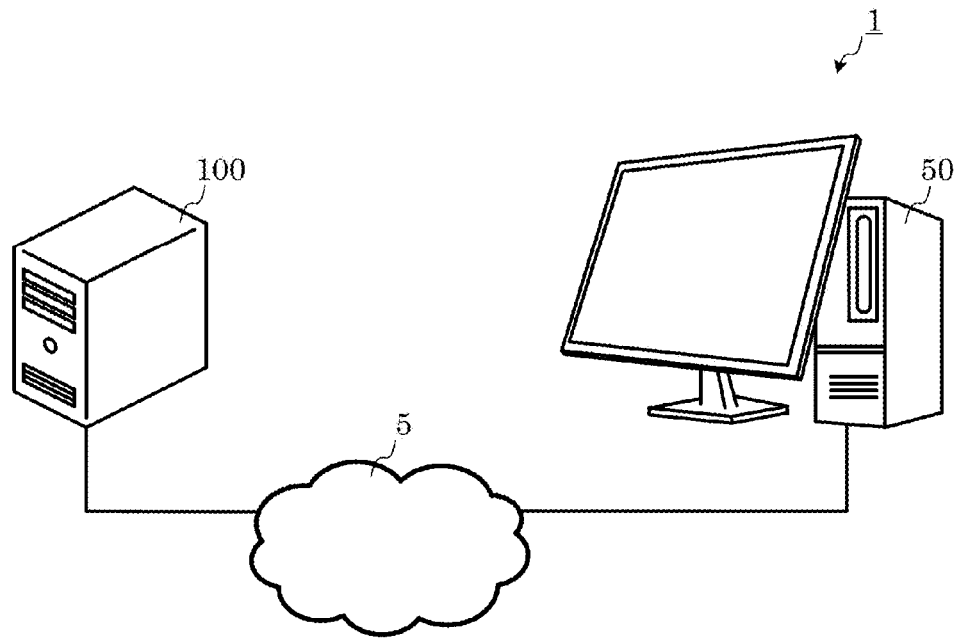
FIG. 1 shows an overall schematic diagram of the data transmission system 1.
Figure 1:
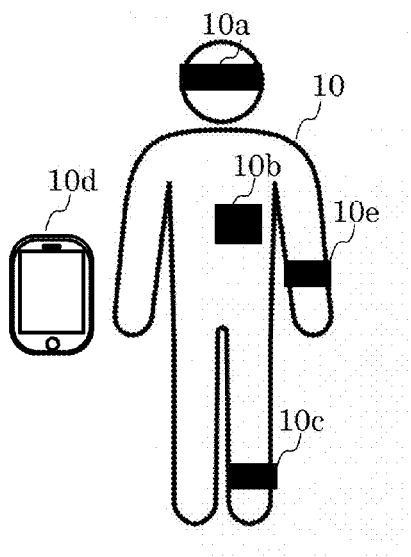
Figure 1:
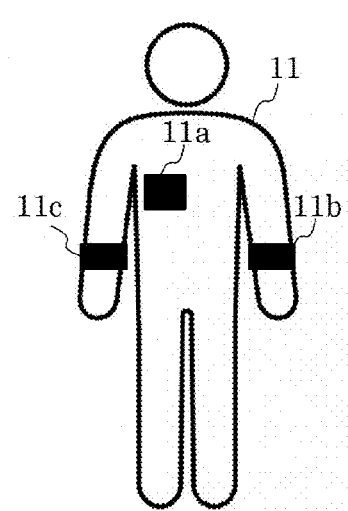

FIG. 1 shows a system configuration diagram of the data transmission system 1 according to a preferred embodiment of the present invention. The data transmission system 1 includes a sender's user terminal 50, a data transmission device 100, receiver's user terminals 10 and 11, and a public line network 5 (e.g., the Internet network, and a fourth generation communication network).

The sender's user terminal 50 is communicatively connected with the data transmission device 100 through a public line network 5. The receiver's user terminal 10 is communicatively connected with the data transmission device 100 through a public line network 5. The sender's user terminal 50 and the receiver's user terminal 10 may be communicatively connected with each other through a public line network 5.

The sender's user terminal 50 may be a general information terminal executing an application, which is an information device or an electrical appliance with the functions to be described later. For example, the sender's user terminal 50 may be a computer terminal, a wearable terminal, a mobile phone, a smart phone, a complex printer, a television, a network device such as a router or a gateway, and a computer, which is capable of communicating with a server. The sender's user terminal 50 may also be white goods such as a refrigerator and a washing machine. The sender's user terminal 50 may also be general information appliances such as a telephone, a netbook terminal, a slate terminal, an electronic book terminal, an electronic dictionary terminal, a portable music player, and a portable player and recorder.

In the same way as the sender's user terminal 50, the receiver's user terminals 10 and 11 may be a computer terminal capable of allowing a user to carry around. For example, the receiver's user terminals 10 and 11 may be a computer terminal, a wearable terminal, a mobile phone, a smart phone, a netbook terminal, a slate terminal, an electronic book terminal, an electronic dictionary terminal, a portable music player, and a portable player and recorder, which is capable of communicating with a server. The receiver's user terminals 10 and 11 may be capable of executing a predefined application (accepts an input for authenticating the user ID) and may be provided with the browser function.

As shown in FIG. 1, the receiver's user terminals 10 and 11 have various modes of the terminal because the terminals owned by each user may be different. That is, user ID "Steve" carries a wearable glass type terminal 10a, a wearable chest belt type terminal 10b, a wearable shoes type terminal 10c, a smart phone 10d, and a wearable watch type terminal 10e as the receiver's user terminal 10. Moreover, user ID "Paul" carries a wearable chest belt type terminal 11a, a wearable watch type terminal 11b, and a wearable hand wrist type terminal 11c as the receiver's user terminal 11. In the following explanations, the receiver's user terminal 11 is omitted and only the receiver's user terminal 10 is used.

The data transmission device 100 may be a normal Web server, and the system may be achieved by a web server, and a browser running on the sender's user terminal 50. The data transmission device 100 is a server provided with a function that judges to which user terminal of which user to transmit a transmission data in response to the specification of the sender's user terminal 50 and executes the transmission. For instance, before transmitting predefined data to user IDs "Steve" and "Paul", the data transmission device 100 judges to which terminal owned by user ID "Steve" and "Paul" the transmission data to be transmitted. Moreover, the data transmission device 100 may be provided with an authentication function of user ID.

Functions

Figure 2:
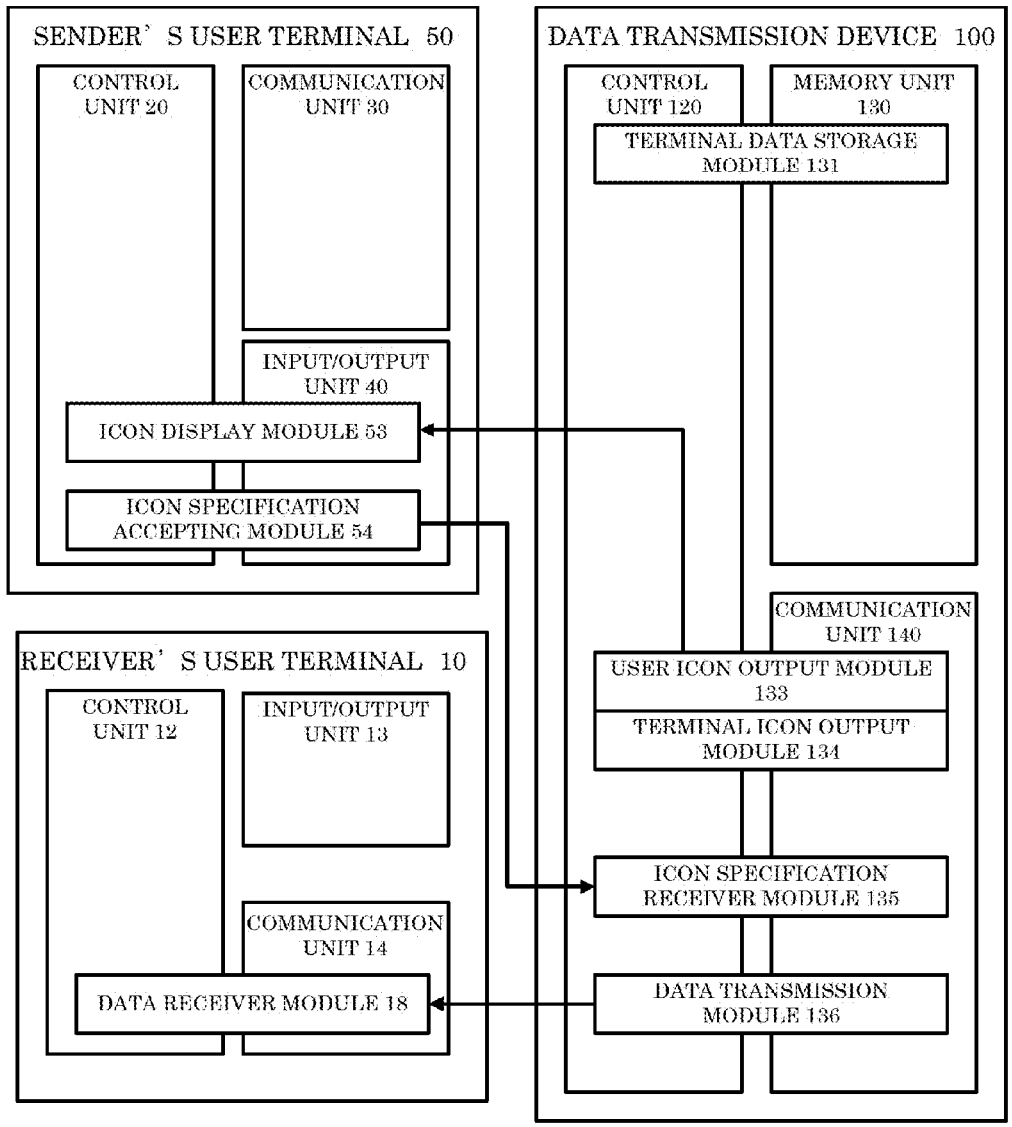
FIG. 2 shows a functional block diagram of the sender's user terminal 50, the data transmission server 100, and the receiver's user terminal 10.

FIG. 2 shows a functional block diagram of the data transmission server 100, the sender's user terminal 50, and the receiver's user terminal 10.

The data transmission device 100 is provided with a control unit 120 including a central processing unit (hereinafter referred to as "CPU"), a random access memory (hereinafter referred to as "RAM"), and a read only memory (hereinafter referred to as "ROM"); and a communication unit 140 including a Wireless Fidelity or Wi-Fi® enabled device complying with, for example, IEEE 802.11, or a wireless device complying with the IMT-2000 standard such as the third generation mobile communication system. The communication unit may include a wired device for LAN connection. The data transmission device 100 is also provided with a storage unit as a memory unit 130 such as a hard disk or a semiconductor memory to store data.

The data transmission device 100 stores the user ID, the terminal data related to the receiver's user terminal 10 owned by the user ID, and a terminal specific receiving address associated with the address of the terminal. A terminal data storage module 131 stores these data as the destination setting data tables shown in FIGS. 7 and 8 in the memory unit 130. Here, the terminal data includes information on the terminal type and the icon of the terminal.

The terminal specific receiving address is an address to identify a destination associated with each terminal, and may be an address specifically set in the application installed in each receiver's user terminal 10. Thus, the transmission data is transmitted only to the terminal corresponding to the address specified by the terminal specific receiving address.

In the data transmission device 100, the control unit 120 reads a predetermined program and cooperates with the memory unit 130 to achieve a terminal data storage module 131. The control unit 120 also reads a predetermined program and cooperates with the communication unit 140 to achieve a user icon output module 133, a terminal icon output module 134, an icon specification receiver module 135, and a data transmission module 136.

The sender's user terminal 50 is provided with a control unit 20 including a CPU, a RAM, and a ROM; and a communication unit 30 including a Wi-Fi® enabled device complying with, for example, IEEE 802.11, or a wireless device complying with the IMT-2000 standard such as the third generation mobile communication system. The communication unit may include a wired device for LAN connection.

The sender's user terminal 50 may also be provided with a storage unit such as a hard disk or a semiconductor memory to store data. The sender's user terminal 50 is also provided with an input/output unit 40 including a display unit outputting and displaying data and images that have been controlled by the control unit 20; and also including a touch panel, a keyboard, and a mouse that receive input from a user.

In the sender's user terminal 50, the control unit 20 also reads a predetermined program and cooperates with the input/output unit 14 to achieve an icon display module 53 and an icon specification accepting module 54.

In the same way as the sender's user terminal 50, the receiver's user terminal 10 is provided with a control unit 12 including a CPU, a RAM, and a ROM; and a communication unit 14 including a Wi-Fi® enabled device complying with, for example, IEEE 802.11, or a wireless device complying with the IMT-2000 standard such as the third generation mobile communication system. The communication unit may include a wired device for LAN connection.

The receiver's user terminal 10 is also provided with a storage unit as a memory unit such as a hard disk or a semiconductor memory to store data. The receiver's user terminal 10 is also provided with an input/output unit 13 including a display unit outputting and displaying data and images that have been controlled by the control unit 12; and also including a touch panel, a keyboard, and a mouse that receive input from a user.

In the receiver's user terminal 10, the control unit 12 reads a predetermined program and cooperates with the communication unit 14 to achieve a data receiver module 18.

Data Transmission Process

Figure 3:
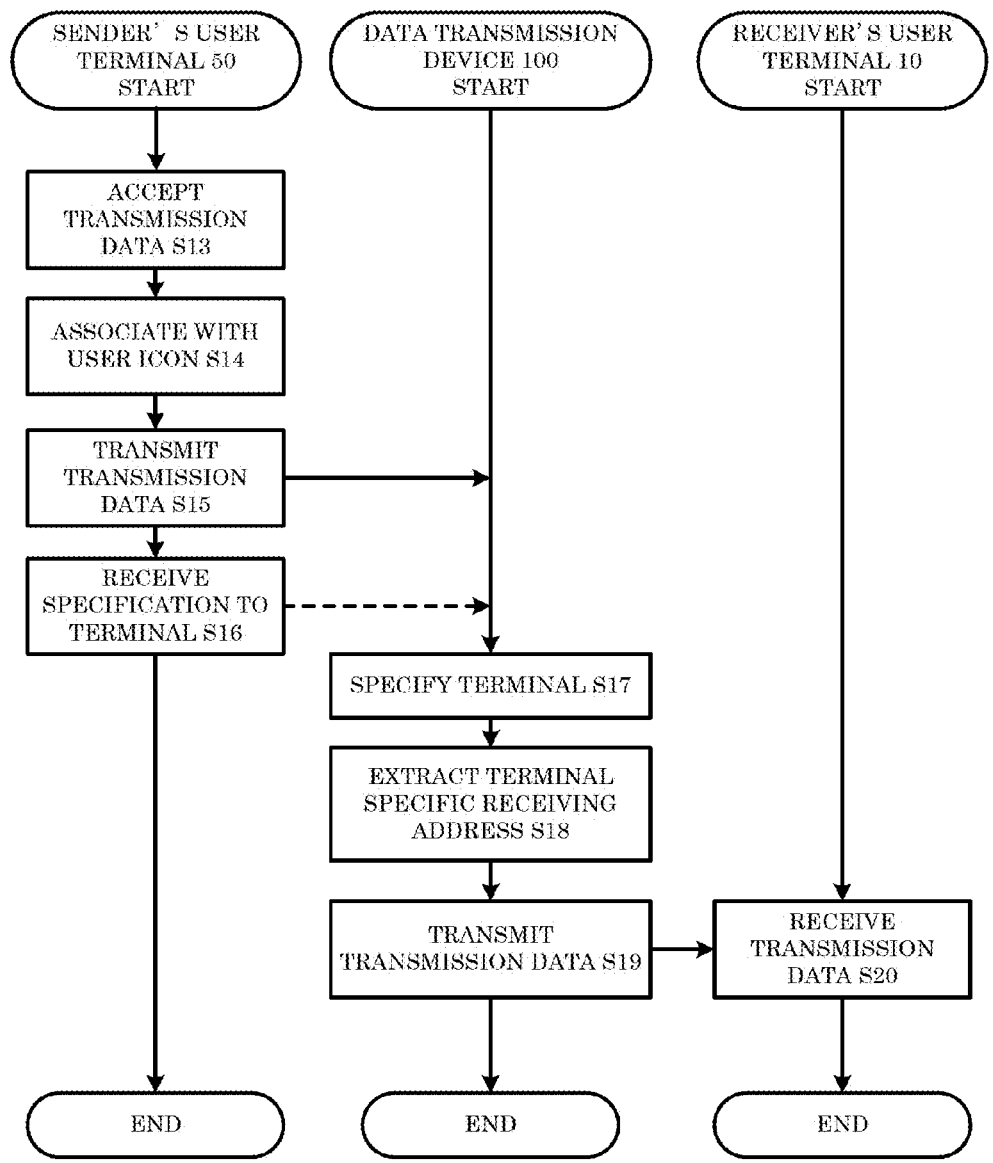
FIG. 3 shows a flow chart illustrating the data transmission process executed by the sender's user terminal 50, the data transmission device 100, and the receiver's user terminal 10.

FIG. 3 shows a flow chart illustrating the data transmission process executed by the data transmission device 100, the sender's user terminal 50 and the receiver's user terminal 10. The process executed by the modules of the above-mentioned devices is explained together with this process. The receiver's user terminal 10 is explained hereinafter by way of illustration only, and not by way of limitation, and the receiver's user terminal 11 may receive the data, and two or more receiver's user terminals may receive the data.

Figure 4:
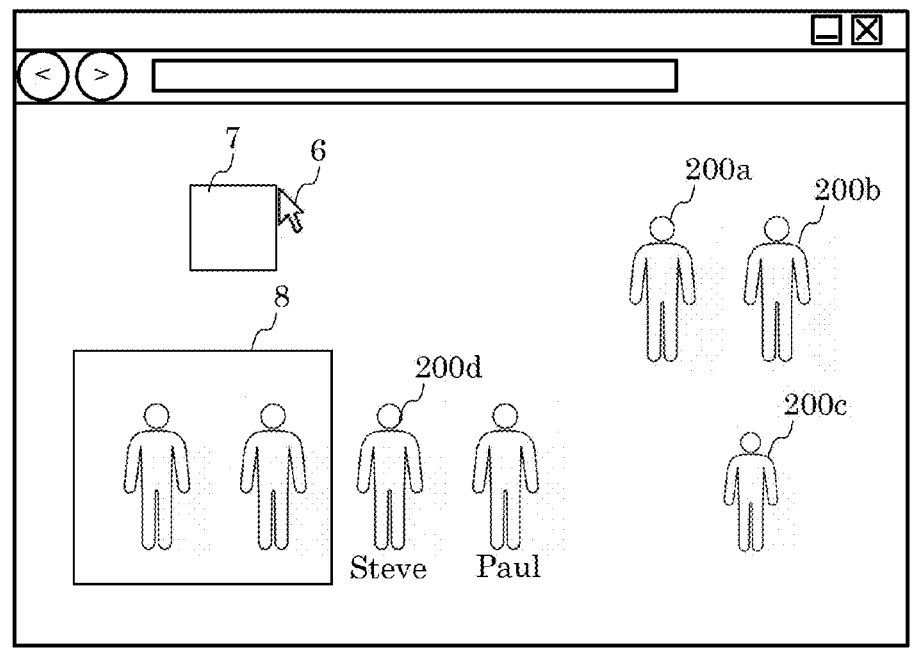
FIG. 4 shows a screen image when sender's user terminal 50 displays two or more user icons indicating the target users to be transmitted.

Suppose that as shown in FIG. 4, the sender's user terminal 50 displays the user icons 200*a-d* and receives the specification of the transmission data that the sender wants to transmit and the user icon as a data transmission destination. For instance, the user icon 200*d* is a user icon of user ID "Steve". FIG. 4 shows a screen window displayed in the sender's user terminal 50, and may be achieved by the program of the browser, etc. For instance, a map data or a name list data may be displayed as a background image, and a user corresponding to each user ID may be displayed as the user icons 200 at the corresponding position on the map data or the name list data.

For instance, as realized by an normal Web server, the user icon output module 133 of the data transmission device 100 outputs (transmits) the data related to the user icon 200 corresponding to the user ID, and the icon display module 53 of the sender's user terminal 50 displays the user icon 200.

Next, in response to the operation specification from the sender, the icon specification accepting module 54 of the sender's user terminal 50 accepts the specification of the transmitted data (Step S13). Then, the transmission data is associated with the user icon by dragging, or etc. the transmission data to specify the destination (Step S14). In response to Step S14, the specified data and the user ID associated with the user icon are transmitted to the data transmission device 100 (Step S15).

Here, the user icon 200 may be associated with two or more user IDs at the same time as shown in FIG. 8. In this case, the association is made by user's specification of two or more user icons 200 in FIG. 8.

Figure 5:
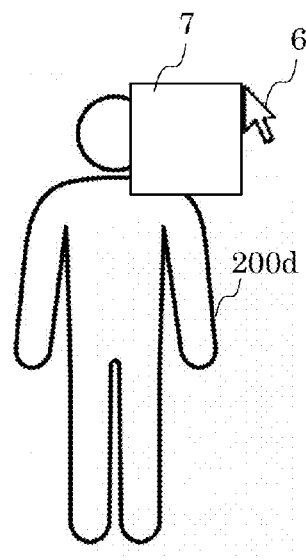
FIG. 5 shows a screen image indicating that a sender associates a transmission data with a user icon.

FIG. 5 shows that the icon of the transmission data 7 is dragged and specified by the pointer 6 to be associated with the user icon 200*d* of user ID "Steve" in the screen window in FIG. 4. Thus, the icon specification accepting module 54 associates the transmission data with the user ID by superimposing the icon of the transmission data 7 over the user icon 200*d*.

Figure 6:
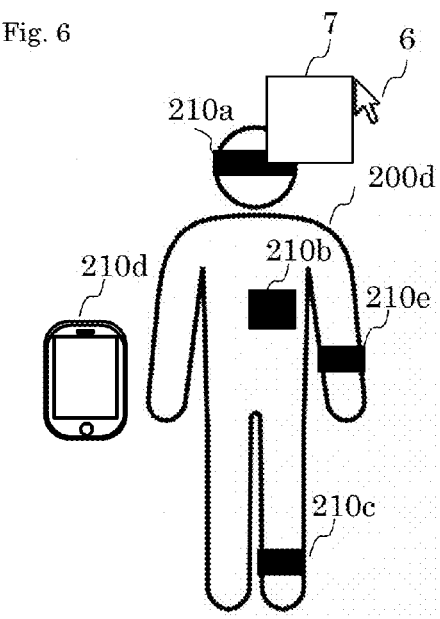
FIG. 6 shows a screen image indicating that a sender associates a transmission data with a terminal icon displayed in the user icon.

Here, the terminal icon output module 134 of the data transmission device 100 may display the terminal icons 210*a-d* in addition to the user icon 200*d* to the icon display module 53 as shown in FIG. 6. In this case, Step S16 is executed.

FIG. 7 shows a destination setting data table associating the icon of the terminal owned by each user ID, a terminal specific receiving address for each terminal, and default destination. FIG. 7 is a data table of user ID "Steve". Based on the data table, the terminal icons 210*a-d* of the user icon 200*d* of user ID "Steve" is outputted and displayed in the sender's user terminal 50.

The icon specification accepting module 54 of the sender's user terminal 50 accepts the specification of the terminal for the terminal icon 210*a-d* from the sender (Step S16).

FIG. 6 shows that the icon of the transmission data 7 is dragged and specified by the pointer 6 to be associated with predefined terminal icons 210*a-d* of the user icon 200*d* of user ID "Steve" in the screen window in FIG. 4. In this case, the transmission data 7 is associated with the terminal icon 210*a* (a wearable glass type terminal). Thus, the icon specification accepting module 54 associates the transmission data with the terminal by superimposing the icon of the transmission data 7 over the terminal icon 210*a*.

In this case, the icon specification accepting module 54 transmits data related to the specified terminal to the data transmission device 100.

Next, the icon specification receiver module 135 of the data transmission device 100 specifies a destination terminal to transmit the transmission data by referring the received user ID and the destination setting data table (Step S17). For instance, when Step S16 is not executed, the icon specification receiver module 13 refers to the user ID and corresponding destination setting data table 1 (user ID "Steve" in case of FIG. 7), and then the terminal is specified as the terminal B because the default destination is set to terminal B. When Step S16 is already executed, Step S17 is not processed because the terminal is already specified.

The destination terminal may be varied according to the transmission data. As described in the destination setting data table 2 of FIG. 8, the mode may be set to transmit the transmission data to terminal A when the transmission data is sentence data or image data, and to terminal C when the transmission data is notification data. In this case, for instance, only if a sentence data with large amount of contents or an image data only have to be checked visually and notified, the wearable watch type terminal may be used to output the data instead of the wearable glass type terminal as the situation demands. Moreover, the setting of transmitting to a smart phone instead of a wearable glass type terminal is also possible in case the sentence data has a predefined amount of contents and the image data has a pixel value greater than a predefined pixel value.

No matter what the destination setting data tables is either 1 or 2, the icon specification receiver module 135 refers to the destination setting data table, extracts the address of the specified terminal (Step S18), and the data transmission module 136 transmits a transmission data (Step S19). In response to Step S19, the data receiver module 18 of the receiver's user terminal 10 receives and processes the transmission data (Step S20).

Moreover, when two or more user icons 200 are specified, the transmission data is transmitted to the terminal corresponding to the two or more user IDs. The process mentioned-above is repeated for each user ID. Moreover, it is also possible to transmit a transmission data to two or more terminals by specifying two or more terminal icons 210.

To achieve the means and the functions that are described above, a computer (including CPU, an information processor, and various terminals) reads and executes a predetermined program. For example, a program is provided in a form recorded in a computer-readable recording medium such as a flexible disk, a CD (e.g., CD-ROM), and a DVD (e.g., DVD-ROM and DVD-RAM). In this case, a computer reads a program from the recording medium, forwards and stores the program to and in an internal or an external storage, and executes it. For example, the program may be previously recorded in a memory (a record medium) such as a magnetic disk, an optical disk, and a magnetic optical disk, and then provided from the memory to the computer through a communication line.

The embodiments of the present invention are described above. However, the present invention is not limited to these embodiments. In addition, the effects described in these embodiments merely illustrate the most preferable effects resulting from the present invention, and the effects according to the present invention are not limited to those described in these embodiments.

REFERENCE SIGNS LIST

1 Data transmission system
5 Public line network
10 Receiver's user terminal
50 Sender's user terminal
100 Data transmission device

What is claimed is:

1. A data transmission device, comprising:
   a user icon output unit that outputs a plurality of user icons respectively associated with a plurality of user IDs to display the user icons in a sender's terminal;
   a data transmission unit that transmits data associated with the user icon specified by the sender's terminal to a terminal specified among a plurality of terminals owned by a user with a user ID that corresponds to the specified user icon among the user IDs; and
   a terminal icon output unit that outputs a plurality of terminal icons associated with the specified user icon to display on the sender's terminal the terminal icons in addition to the specified user icon, the terminal icons being respectively associated with the terminals owned by the user with the user ID corresponding to the specified user icon,
   wherein the terminal specified among the plurality of terminals is a terminal associated with a terminal icon specified by the sender's terminal among the terminal icons.

2. The data transmission device according to claim 1, further comprising:
   a receiving terminal setting receiver unit that receives and stores a setting of a receiver's user terminal to be used for receiving data from the data transmission device,
   wherein the data transmission unit transmits the predefined data to a previously stored receiver's user terminal.

3. The data transmission device according to claim 1, wherein the terminal specified among the plurality of terminals is a terminal set as a default terminal among the terminal when the terminal icon is not specified by the sender's terminal.

4. A data transmission method executed by a data transmission device, comprising:
   outputting a plurality of user icons respectively associated with a plurality of user IDs to display the user icons in a sender's terminal; and
   transmitting data associated data with the user icon specified by the sender's terminal to a terminal specified among a plurality of terminals owned by a user with a user ID that corresponds to the specified user icon among the user IDs; and
   outputting a plurality of terminal icons associated with the specified user icon to display on the sender's terminal the terminal icons in addition to the specified user icon, the terminal icons being respectively associated with the terminals owned by the user with the user ID corresponding to the specified user icon,
   wherein the terminal specified among the plurality of terminals is a terminal associated with a terminal icon specified by the sender's terminal among the terminal icons.

5. The data transmission method according to claim 4, wherein the terminal specified among the plurality of terminals is a terminal set as a default terminal among the terminal when the terminal icon is not specified by the sender's terminal.

6. A computer program product, for use in a data transmission device, comprising a non-transitory computer usable medium having a set of instructions physically embodied therein, the set of instructions including computer readable program code, which when executed by the data transmission device causes the information processing unit to
   output a plurality of user icons respectively associated with a plurality of user IDs to display the user icons in a sender's terminal;
   transmit predefined data associated with the user icon specified by the sender's terminal to a terminal specified among a plurality of terminals owned by a user with a user ID that corresponds to the specified user icon among the user IDs; and
   output a plurality of terminal icons associated with the specified user icon to display on the sender's terminal the terminal icons in addition to the specified user icon, the terminal icons being respectively associated with the terminals owned by the user with the user ID corresponding to the specified user icon,
   wherein the terminal specified among the plurality of terminals is a terminal associated with a terminal icon specified by the sender's terminal among the terminal icons.

7. The computer program product according to claim 6, wherein the terminal specified among the plurality of terminals is a terminal set as a default terminal among the terminal when the terminal icon is not specified by the sender's terminal.

* * * * *